Patented Dec. 17, 1935

2,024,826

UNITED STATES PATENT OFFICE 2,024,826

CARRIER WEB AND METHOD OF FORMING SAME

Edouard M. Kratz, Gary, Ind., assignor, by mesne assignments, to Marbo Products Corporation, Chicago, Ill., a corporation of Delaware No Drawing. Application June 29, 1933, Serial No. 678,307

9 Claims. (Cl. 18—15)

This invention relates to a novel film-forming base or supporting carrier web for transparent sheet material and includes a process for making transparent sheets or films on such base or carrier web.

More specifically, this invention relates to the preparation of a flexible, non-metallic web or belt having a smooth and flexible surface for acting as a base in the preparation of transparent films or sheets made of protein material such as gelatine, casein and the like.

In the manufacture of transparent films of protein material, it has heretofore been proposed to cast the film on webs or belts made of metals having smooth polished surfaces. Such metal materials, however, can only be used for short periods because they rapidly acquire scratches and abrasions, which prevent the formation of a smooth and even sheet thereon. Since the cast film usually travels through a festoon drier while supported on the belt to effect a complete setting of the film before it is stripped from the belt, it is obvious that a metal belt is difficult to handle and will soon warp and bulge out of shape.

Hoskins, in U. S. Patent #1,582,605, has proposed using a film-forming base made of a cellulose ester plastic material, such as a nitrocellulose photographic film stock or cellulose acetate. The use of a cellulose ester belt, while having many advantages over the use of metallic belts, also possesses many disadvantages. The ester belt must be cast on a solid foundation, such as a polished roll, and allowed to remain on the foundation until the ester composition is dry so that it may be stripped therefrom. Otherwise the resulting web would cockle and buckle out of shape and take the form of the support in the dryer. Rack types of driers, of course, could not be used. The cellulose ester belt is highly inflammable and presents a great fire hazard in commercial operation. In addition, this type of belt curls badly at the edges and must be entirely replaced when scratched or worn. Damage to even a small portion of the belt renders the whole belt unfit for use, since attempts to recast the damaged portion would result in a softening of the belt as the solvents in the coating composition would penetrate down into the belt. A redrying of the softened belt would be most difficult as it would have to be supported on a smooth, rigid carrier. A redrying also would normally result in warping and cockling.

I have now prepared a carrier belt having all of the advantages of a cellulose ester belt but possessing none of its disadvantages. My novel belt is relatively non-inflammable, is capable of withstanding tremendous abuse, does not curl, and may be re-surfaced when worn.

In accordance with my invention, a fabric material, such as muslin or the like, is coated with a cellulose ester film such as nitrocellulose or cellulose acetate. The ester film is made plastic by the incorporation of large amounts of plasticizers, such as tri-cresyl phosphate, dibutyl phthalate, and other plasticizers well known to the lacquer industry. It is generally desirable to incorporate a pigment into the first coating applied to the fabric to fill up the weave marks. Subsequent coatings need not be pigmented.

In a preferred form of my invention, to insure against the tendency of the belt to curl in on the edges when hanging in the festooning device, I have laminated two fabrics together using a sheet of coarse muslin for the bottom lamination and a fine muslin sheet for the top lamination. The laminated belt is formed by uniting the two sheets together with a plasticized pyroxylin composition such as a plasticized "dope" cotton lacquer. The fine muslin side is next coated with a pigmented cellulose ester composition. The pigment acts as a filler to obliterate the weave marks of the muslin. Succeeding coats of a clear plasticized nitrocellulose composition are applied until the surface is smooth and even. The final coatings are made with the composition hereinafter more fully described which does not swell the pigmented coating and permit the weave marks to extend through the pigment. The surfaces are preferably rubbed down or calendered before the next coating is applied.

The back of the coarse muslin surface is also preferably coated with a pigmented pyroxylin dope material. This back coating prevents drying out of the fabric and also reduces the tendency of the belt to curl.

It is therefore an object of this invention to provide a non-metallic film-forming base for use in the preparation of transparent sheet material which is capable of being re-surfaced when worn, is relatively non-inflammable and does not curl in the drier.

It is another object of this invention to provide a strong, durable, non-metallic carrier web for use in the forming of transparent protein sheets.

A specific object of this invention is to provide a film-forming base composed of laminated fabric material having at least one side coated with a highly plasticized cellulose-ester film.

Another object of this invention is to provide a process of forming protein sheet material on a cellulose-ester surface which is anchored on a relatively non-inflammable supporting belt.

Another object of this invention is to provide a method for casting transparent sheets of casein material onto a traveling non-metallic surface from which the formed casein sheet is readily removed without injury.

My previous attempts to use fabric materials as film forming bases in transparent sheet production were unsatisfactory because of the apparent impossibility of obtaining a smooth, brilliant surface on the casting side of the belt. Great difficulty was also experienced in obtaining the proper flexibility for the belt. Attempts were made to coat the carrier belt with a pyroxylin composition to hide the weave of the fabric so that it would not show in the film cast thereon. The pyroxylin dope coated on the fabric, however, would form a film having the formation of the weave of the fabric. Even the application of additional layers of pyroxylin dope would not overcome this formation because, as each succeeding layer of dope was added, the solvents therein would sink down into the other layers and swell the entire coating. As the solvents evaporated the coating would again shrink back to take the original formation of the weave of the cloth. This weave formation, of course, was visible in the transparent sheet cast on the belt and in addition, a sheet cast on this type of surface adheres to the surface and is extremely difficult to strip therefrom without tearing holes in the sheet.

I have now found that a fabric belt coated with a composition composed of five parts of "dope" cotton and about four parts by weight of tri-cresyl phosphate dissolved in a solvent such as ethyl acetate and butyl acetate has great advantages over belts heretofore prepared. The viscosity of the solution composition can be modified by increasing or decreasing the amount of solvent used so as to regulate the thickness of the coating.

A carrier belt of the above type can be refinished by removing the worn or scratched coating with emery paper. In refinishing the surface, the coating roll of the paper machine is replaced with a steel roll covered with a fine emery paper and the carrier web is fed through the paper machine in the same manner as in the coating operation. The emery paper covered roll is rotated in a moderate speed in the reverse direction to the travel of the carrier belt and the bottom of the roll is preferably immersed in a water or solvent, such as naphtha, to keep the paper clean. In this way, all the scratches, pimples, craters and the like which may have developed during the continued use of the belt are sanded off and the surface made exceptionally smooth and receptive for another coating of plasticized dope cotton.

In the casting of casein sheets or sheets containing fatty material which cause pock marks or craters due to the breaking of the surface tension at the time of casting, it is necessary to use dispersing agents, such as sulfonated oils or the like to prevent a breaking of the surface tension. It is also desirable in some instances to add various types of plasticizers to the film being cast, in which case it is necessary to add an emulsifying agent. Emulsifying agents and wetting agents have a tendency to increase the adherence of the cast film to the web. I have found that after continued use of a carrier belt coated with dope cotton which has been plasticized with a plasticizer, such as tri-cresyl phosphate, there is a tendency for the plasticizer to work out of the coating and cause a sticking of the film to the web. I have, therefore, devised an improved formula, containing a plasticizer anchoring and film relieving agent, such as butyl stearate, for coating fabric carrier belts with a smooth, flexible film having a brilliant, tough finish and presenting a surface which is readily separable from a sheet cast thereon.

My improved coating composition for the fabric web used according to this invention contains the following ingredients in about the proportions indicated:

Solids

| | Parts |
|---|---|
| 15 to 20 second nitrocellulose cotton (dry weight) | 100 |
| "Lindol" (tri-cresyl phosphate) | 50 to 80 |
| Butyl stearate | 2 to 15 |

Solvent

| | Parts |
|---|---|
| Butyl acetate | 100 to 500 |
| Ethyl acetate | 500 to 1500 |

A preferred specific composition which has been used with great success has the following formula:

Solids

| | Parts |
|---|---|
| 15 to 20 second nitrocellulose cotton (dry weight) | 100 |
| "Lindol" (tri-cresyl phosphate) | 72 |
| Butyl stearate | 8 |

Solvent

| | Parts |
|---|---|
| Butyl acetate | 390 |
| Ethyl acetate | 910 |

It is to be understood that other plasticizers commonly used in the lacquer industry may be used in place of tri-cresyl phosphate. However, it has been found that tri-cresyl phosphate possesses desirable properties of imparting the correct amount of flexibility to the film without unduly softening the same.

The butyl stearate present in the coating composition, besides retaining the plasticizer in the film, greatly increases the brilliance and polish of the film surface. As a result the film cast on the surface is readily removed. Other stearates, while operative, are less desirable. For instance the metal stearates, such as calcium and zinc stearates, greatly embrittle the film. Stearate waxes also decrease the flexibility of the coating.

From the above description, it is apparent that I have devised a sheet having a fabric backing coated with a smooth, flexible surface which is readily separable from protein sheet material even when casein sheets containing large amounts of fatty material and emulsifying agents are cast onto the base. The coated fabric material is superior to the all-nitrocellulose base heretofore proposed in many respects and is less hazardous to use because it is less inflammable. Commercial production requires the use of many yards of belting through the festooning device and casting machine and it is obvious that the fire hazard of an all-nitrocellulose belt is a considerable factor. The fabric used in my invention may, if desired, be treated with a fireproofing agent before receiving a coating of the surface material. Such treatment almost eliminates the fire hazard.

I am aware that numerous details of the process may be varied through a wide range without departing from the principles of this invention, and I, therefore, do not purpose limiting the patent granted hereon otherwise than necessitated by the prior art.

I claim as my invention:

1. A carrier belt for casting transparent sheet material comprising a liminated fibrous web, a smooth flexible nitrocellulose coating anchored on the top surface of said web, and a pigmented cellulose ester coating on the back of said web to prevent the same from curling.

2. A carrier web for acting as a film-forming base in the casting of the transparent protein sheets comprising a laminated muslin web coated on one surface thereof with a composition having the following initial formula:

| | Parts |
|---|---|
| Nitrocellulose | 100 |
| Tri-cresyl phosphate | 50 to 80 |
| Butyl stearate | 2 to 15 |
| Butyl acetate | 1 to 500 |
| Ethyl acetate | 500 to 1500 |

3. As a new article of manufacture, a film forming base for use in casting protein sheets thereon, comprising a coarse muslin web, a fine muslin web laminated thereon, and a plasticized cellulose-ester film presenting a smooth, brilliant surface coated on said fine muslin web.

4. As a new article of manufacture, a casting belt for transparent protein film production composed of a backing of fabric material and having a smooth brilliant top surface coated with a composition having the following initial formula:

| | Parts |
|---|---|
| 15 to 20 second nitrocellulose cotton (dry weight) | 100 |
| Lindol (tri-cresyl phosphate) | 72 |
| Butyl stearate | 8 |
| Butyl acetate | 390 |
| Ethyl acetate | 910 |

5. A casting belt for transparent sheet material comprising a relatively coarse fabric web, a relatively fine fabric web secured thereon with a plasticized pyroxylin adhesive, a pigmented pyroxylin coating on the outside surface of said fine fabric web, a plurality of coatings of a clear cellulose ester coating composition containing butyl stearate and a plasticizer on said pigmented coating to present a smooth brilliant surface and a pigmented pyroxylin coating on the back of said coarse web.

6. A casting belt for transparent sheet material comprising a fine muslin web, a pigmented pyroxylin coating on one surface thereof, and a plurality of coatings of a clear, plasticized nitrocellulose coating composition containing a stearate anchored thereon to form a smooth brilliant surface from which the sheet material is readily removed.

7. The process of preparing a casting belt for transparent sheet material which comprises coating one side of a fabric web with a pigmented pyroxylin composition, allowing said coating to dry, applying additional coatings if necessary until the weave marks of the fabric do not show, coating the pigmented surface with a clear cellulose ester coating composition containing a plasticizer and a stearate, polishing the resulting surface when dry, and applying additional coatings of the same clear composition until a smooth brilliant surface is obtained.

8. The process of preparing a casting belt for transparent sheet material which comprises securing a web of fine muslin onto a web of coarse muslin with a plasticized pyroxylin adhesive, coating the outside surface of the fine muslin with a pigmented pyroxylin coating composition to obliterate the weave marks, alternatively coating the surface with a clear plasticized nitrocellulose coating composition containing butyl stearate and polishing the resulting surfaces until a smooth brilliant surface is obtained and coating the back surface of the coarse muslin with a pigmented pyroxylin composition to prevent the belt from curling.

9. A casting belt for transparent sheet material comprising a laminated fibrous web, a pigmented cellulose ester coating on one surface of said web, and a smooth flexible cellulose ester coating anchored to said pigmented coating to form a surface from which the sheet material is readily removed.

EDOUARD M. KRATZ.